United States Patent [19]

Asanuma et al.

[11] Patent Number: 4,790,560
[45] Date of Patent: Dec. 13, 1988

[54] INDEPENDENT REAR SUSPENSION FOR USE ON MOTOR VEHICLES

[75] Inventors: Nobuyoshi Asanuma, Saitama; Kanji Kubo, Kanagawa; Keiichi Mitobe, Tokyo, all of Japan

[73] Assignee: Honda Giken Kogyo Kabushiki Kaisha, Tokyo, Japan

[21] Appl. No.: 868,808

[22] Filed: May 29, 1986

[30] Foreign Application Priority Data

Jun. 3, 1985 [JP] Japan ................. 60-120243

[51] Int. Cl.$^4$ ............................................. B60G 3/00
[52] U.S. Cl. ....................................... 280/701; 280/690
[58] Field of Search ................. 280/688, 690, 700, 701

[56] References Cited

U.S. PATENT DOCUMENTS

| | | | |
|---|---|---|---|
| 4,245,853 | 1/1981 | Inoue | 280/701 |
| 4,456,282 | 6/1984 | Rumpel | 280/690 |
| 4,511,160 | 4/1985 | Inoue | 280/701 |
| 4,529,222 | 7/1985 | Kijima et al. | 280/701 |
| 4,650,209 | 3/1987 | Sumimoto | 280/701 |
| 4,650,211 | 3/1987 | Tanahashi | 280/701 |

FOREIGN PATENT DOCUMENTS

| | | | |
|---|---|---|---|
| 83183 | 7/1983 | European Pat. Off. | 280/701 |
| 83206 | 7/1983 | European Pat. Off. | 280/701 |
| 136563 | 4/1985 | European Pat. Off. | 280/701 |
| 2038880 | 2/1972 | Fed. Rep. of Germany | 280/701 |
| 1425503 | 12/1965 | France | 280/701 |
| 2552374 | 3/1985 | France . | |
| 698921 | 12/1965 | Italy | 280/701 |
| 51508 | 3/1982 | Japan | 280/701 |
| 58-76316 | 5/1983 | Japan . | |
| 64006 | 4/1985 | Japan | 280/701 |
| 116513 | 6/1985 | Japan | 280/690 |
| 1372051 | 10/1974 | United Kingdom . | |
| 2130979 | 6/1984 | United Kingdom . | |

Primary Examiner—David M. Mitchell
Assistant Examiner—Ross Weaver
Attorney, Agent, or Firm—Irving M. Weiner; Joseph P. Carrier; Pamela S. Burt

[57] ABSTRACT

An independent rear suspension includes a knuckle having a spindle for supporting a wheel, the spindle having a central axis, a trailing arm coupled to the knuckle, a pair of spaced lower arms pivotally mounted on the knuckle, a knuckle arm extending substantially upwardly from the knuckle, an upper arm pivotally mounted on the knuckle arm, and a damper having a lower end coupled to the knuckle at a position below the central axis of the spindle, the damper having a lower portion disposed between the spaced lower arms and in the vicinity of the central axis of the spindle.

2 Claims, 2 Drawing Sheets

INDEPENDENT REAR SUSPENSION FOR USE ON MOTOR VEHICLES

BACKGROUND OF THE INVENTION

1. Field of the Invention

The present invention relates to an independent rear suspension including a trailing arm, for use on a motor vehicle, and more particularly to a damper attachment structure for such an independent rear suspension.

2. Description of the Relevant Art

Japanese Laid-Open Patent Publication No. 60-92106 published on May 23, 1985 discloses an independent rear suspension for use on a motor vehicle. The disclosed independent rear suspension generally comprises a knuckle for supporting a wheel, a trailing arm coupled to the knuckle, a pair of front and rear lower arms coupled to the knuckle, and an upper arm coupled to a knuckle arm extending upwardly from the knuckle. The prior independent rear suspension is functionally equivalent to the so-called double wishbone suspension. A damper or shock absorber has its lower end attached to the knuckle adjacent to the lower arms such that the damper lower end is offset or displaced in the fore-and-aft direction of the motor vehicle from the center of the wheel when viewed in side elevation. This is undesirable from the standpoint of damper performance since, when the wheel is moved vertically during travel of the motor vehicle, the damper lower end is subjected to a twisting moment commensurate with the extent by which damper lower end is displaced from the wheel center. In addition, an elastic bushing interposed between the upper end of the damper and the vehicle body undergoes undue external forces when the wheel is moved vertically. The knuckle and the lower arms are required to be of a large mechanical strength in order to withstand the twisting moment imposed on the damper lower end, resulting in increased weights of the suspension components.

SUMMARY OF THE INVENTION

It is an object of the present invention to provide an independent rear suspension for motor vehicles which includes a damper disposed between front and rear lower arms and coupled to a knuckle for eliminating a twisting moment on a damper lower end, thus reducing the weight of the suspension, and for providing an increased stroke for the damper.

According to the present invention, there is provided an independent rear suspension comprising a knuckle having a spindle for supporting a wheel, the spindle having a central axis, a trailing arm coupled to the knuckle, a pair of spaced lower arms pivotally mounted on the knuckle, a knuckle arm extending substantially upwardly from the knuckle, an upper arm pivotally mounted on the knuckle arm, and a damper having a lower end coupled to the knuckle at a position below the central axis of the spindle, the damper having a lower portion disposed between the spaced lower arms and in the vicinity of the central axis of the spindle.

More specifically, the lower portion of the damper is located substantially in alignment with the central axis of the spindle when viewed in side elevation. The knuckle has a damper attachment leg extending substantially downwardly therefrom below the central axis of the spindle, the lower end of the damper being pivotally coupled to the damper attachment leg.

With this arrangement, the space between the lower arms is effectively utilized by positioning the damper therein. Since the lower portion of the damper is substantially aligned with the central axis of the spindle, no appreciable twisting moment is applied to the damper, and hence the damper and elastomeric bushings on its upper end can effectively perform their function while the suspension is in operation. Inasmuch as no substantial twisting forces are imposed on the damper, there is no need to increase the mechanical strength of components of the suspension to compensate for such twisting forces. Therefore, the suspension can be lightweight. The stroke of the damper is increased because the lower end of the damper is coupled to the damper attachment leg disposed below the central axis of the spindle.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
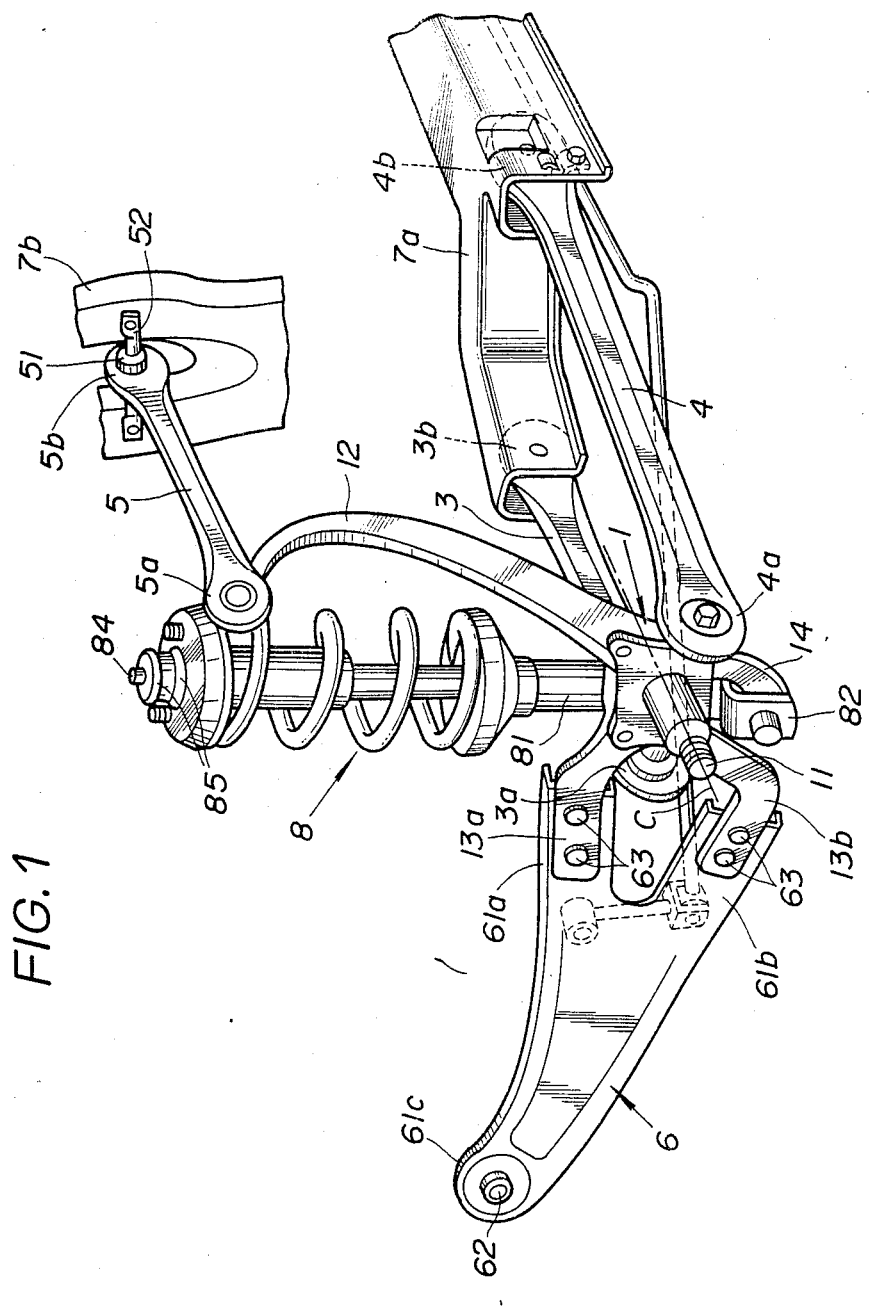
FIG. 1 is a perspective view of an independent rear suspension to the present invention.
Figure 2:
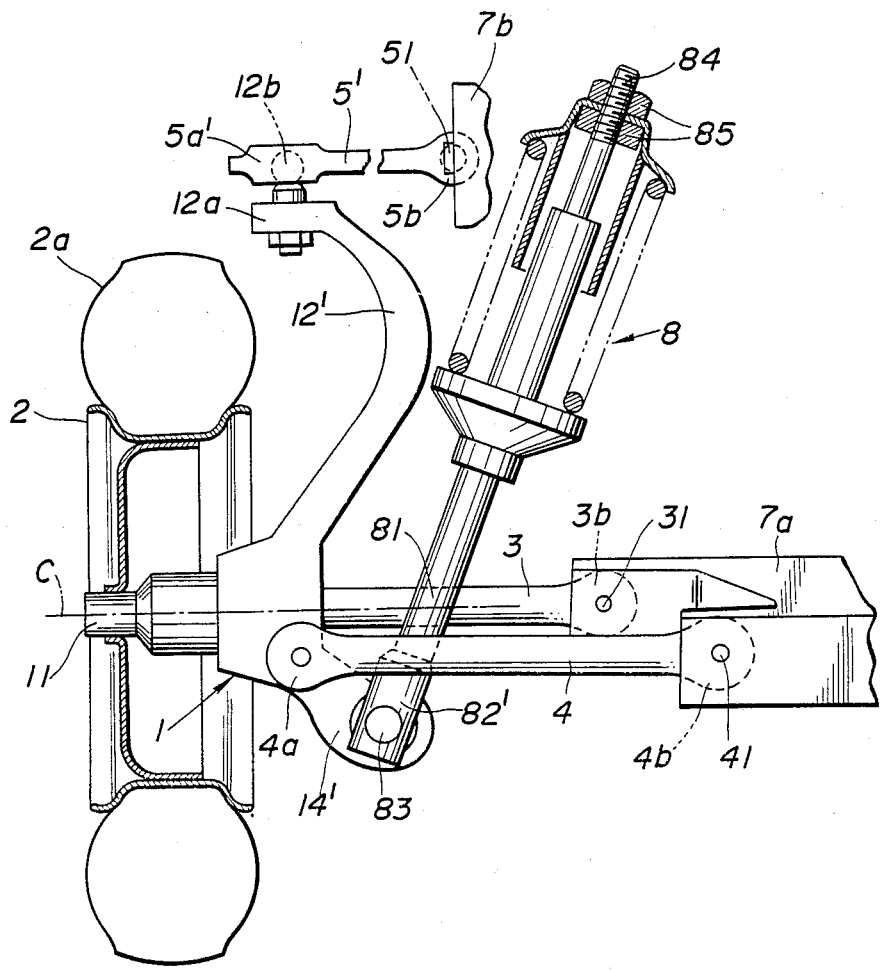
FIG. 2 is a rear elevational view of the independent rear suspension of FIG. 1 with a wheel rotatably mounted thereon.

As shown in FIGS. 1 and 2, an independent rear suspension for a motor vehicle according to the present invention includes a knuckle 1 having a spindle 11 projecting outwardly from an outer surface thereof. A wheel 2 including a tire 2a is rotatably supported on the spindle 11. The suspension also includes front and rear lower arms 3, 4 spaced from each other and extending transversely across the longitudinal or fore-and-aft direction of the motor vehicle, the lower arms 3, 4 having outer ends 3a, 4a (left ends in FIG. 2) pivotally coupled to opposite sides of the knuckle 1. The respective inner ends 3b, 4b of the lower arms 3, 4 are pivotally coupled through elastomeric bushings 31, 41, respectively, to a crossbeam 7a of the vehicle body.

From an upper rear end of the knuckle 1, there extends upwardly a knuckle arm 12 with its upper portion extending rearwardly (toward the viewer of FIG. 2) and inwardly (to the right FIG. 2). An upper arm 5 has an outer end 5a pivotally coupled to the upper end 12a of the knuckle arm 12 through a ball-and-socket joint 12b. The inner end 5b of the upper arm 5 is pivotally connected to a bracket 7b through an elastomeric bushing 51 by a pivot rod 52 fixed to the bracket 7b which is secured to a wall of a wheel house accommodating the wheel 2.

As shown in FIG. 1, the knuckle 1 has a pair of upper and lower joint arms 13a, 13b extending forwardly from a front side of the knuckle 1. The suspension includes a trailing arm 6 extending in the longitudinal direction of the motor vehicle and lying in a vertical plane. The trailing arm 6 has a pair of upper and lower joint arms 61a, 61b fastened respectively to the joint arms 13a, 13b of the knuckle 1 by means of bolts 63. The trailing arm 6 has a front end 61c pivotally mounted on a vehicle body member (not shown) through an elastomeric bushing 62. The trailing arm 6 is made of a leaf spring material which is highly rigid against bending stresses applied along its plane, and which is sufficiently resilient under forces imposed across its plane.

A damper attachment leg 14 projects downwardly and inwardly from the lower end of the knuckle 1, and lies substantially immediately beneath the central axis C of the wheel 2, i.e., the spindle 11 (hereinafter referred to as a "wheel center C"), when viewed in side elevation. A hydraulic damper or shock absorber 8 is positioned inwardly of the knuckle 1 and has a lower portion 81 disposed between the front and rear lower arms 3, 4. The lower end 82 of the damper 8 is pivotally mounted on the damper attachment leg 14 through an elastomeric bushing 83. The upper end 84 of the damper 8 is coupled through elastomeric bushings 85 to a vehicle body member (not shown) such that the lower portion 81 of the damper 84 lies substantially in alignment with the wheel center C when viewed in side elevation.

With the damper 8 disposed between the lower arms 3, 4 and the lower portion 81 thereof substantially aligned with the wheel center C, the damper 8 is substantially free from a twisting moment when the wheel 2 is vertically moved during travel of the motor vehicle. Therefore, the damper 8 and the elastomeric bushing 85 are capable of performing their function quite well during operation of the suspension. By virtue of applicant's novel design, there is no need to increase the mechanical strength of suspension components to withstand the twisting moment which would otherwise be imposed on them, and hence the suspension is reduced in weight.

Since the lower end 82 of the damper 8 is mounted on the damper attachment leg 14 located below the wheel center C, a sufficiently long stroke is available of the damper 8.

The modified independent rear suspension shown in FIG. 2 is substantially identical to that shown in FIG. 1 except for the orientations of the connections between upper arm 5 and control arm 12, and between the lower end 82 of the damper 8 and the damper attachment leg 14. The modified components in FIG. 2 are indicated by similar reference numerals to those in FIG. 1, but are distinguished as prime characters. As shown, the connection between upper arm 5 and knuckle arm 12 is oriented horizontally in FIG. 1, whereas the corresponding connection between upper arm 5' and knuckle arm 12' is oriented vertically in FIG. 2. Similarly, the connection between the lower end 82 of damper 8 and the damper attachment leg 14 is oriented longitudinally in FIG. 1, whereas the corresponding connection between the lower end 82' of damper 8 and the damper attachment leg 14' is oriented transversely in FIG. 2.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. An independent rear suspension comprising:
    a knuckle having a spindle for supporting a wheel rotatably thereon, said spindle having a central axis;
    a trailing arm coupled to said knuckle;
    a pair of spaced lower links pivotally mounted on said knuckle;
    a knuckle arm extending substantially upwardly from said knuckle;
    an upper link pivotally mounted on said knuckle arm; and
    a damper having a lower end coupled to said knuckle at a position below the central axis of said spindle, said damper having a lower portion disposed between said spaced lower links and in the vicinity of said central axis of said spindle;
    said lower portion of said damper is located substantially in alignment with said central axis of said spindle when viewed in side elevation.

2. An independent rear suspension according to claim 1, wherein said knuckle has a damper attachment leg extending substantially downwardly therefrom below said central axis of the spindle, said lower end of said damper being pivotally coupled to said damper attachment leg.

* * * * *

UNITED STATES PATENT AND TRADEMARK OFFICE
CERTIFICATE OF CORRECTION

PATENT NO. : 4,790,560

DATED : December 13, 1988

INVENTOR(S) : Asanuma et al.

It is certified that error appears in the above-identified patent and that said Letters Patent is hereby corrected as shown below:

Title page, after item [22] insert: [63] Related U.S. Application Data
and
Column 1, before line 1, insert:
--This is a continuation-in-part of application Serial No. 773,438 filed September 6, 1985, which issued as U. S. Patent No. 4,690,426 on September 1, 1987. This is also a continuation-in-part of application Serial No. 773,439 filed September 6, 1985.--.
Column 2, line 24, after "suspension" insert --according--.

Signed and Sealed this

Thirtieth Day of May, 1989

Attest:

DONALD J. QUIGG

*Attesting Officer*

*Commissioner of Patents and Trademarks*